Dec. 22, 1953          R. O. HENSZEY           2,663,212
                       SANITARY FASTENER
                       Filed Nov. 3, 1950
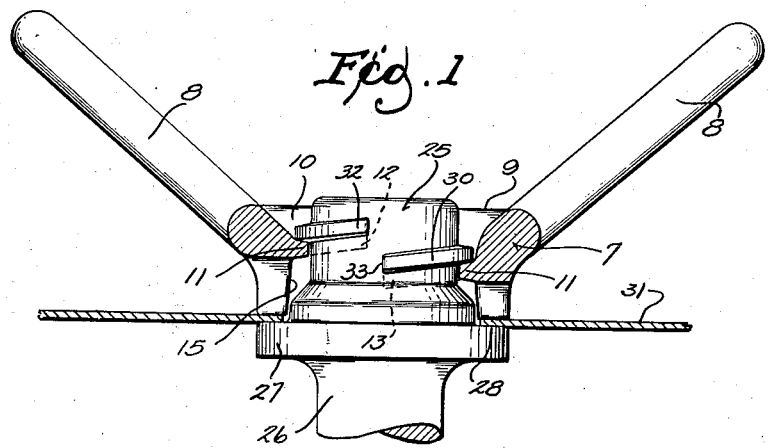
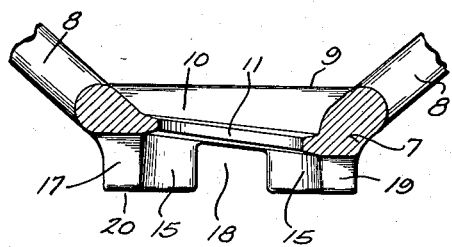 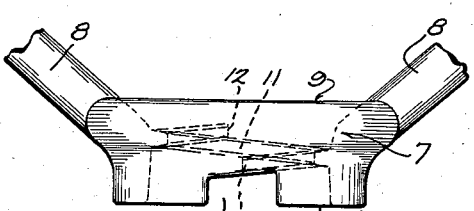
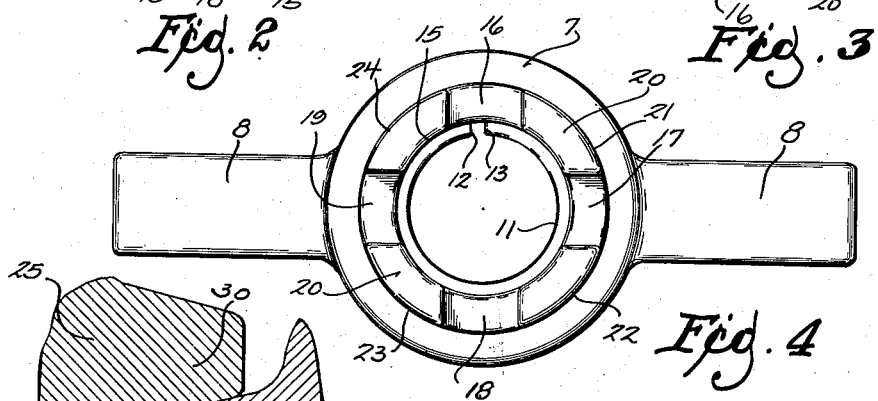
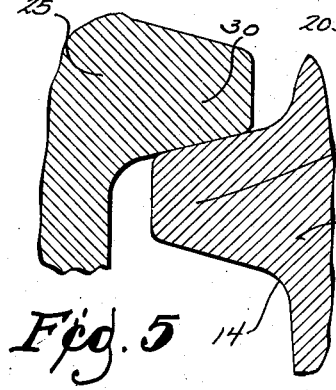
Inventor
ROY O. HENSZEY
By
Wheeler, Wheeler & Wheeler
Attorneys Patented Dec. 22, 1953

2,663,212

UNITED STATES PATENT OFFICE 2,663,212

SANITARY FASTENER

Roy O. Henszey, Oconomowoc, Wis.

Application November 3, 1950, Serial No. 193,913

4 Claims. (Cl. 85—1)

This invention relates to a sanitary fastener.

The hereinafter disclosed fastener has particular utility in apparatus where it is submerged in or comes in contact with a contaminable or perishable fluid such as milk. Otherwise bacterial growth may occur in stagnant matter in grooves, pockets and crevices. For example: in providing for the connecting together of parts inside of the milk and vapor separating chamber of a milk evaporator, it is inadmissible to use fasteners such as ordinary threaded bolts, nuts and screws, because of the crevices formed by the threads. These crevices are small but are sufficiently large for bacterial growth. Such threads are difficult to clean; furthermore matter lies stagnant in them, and bacteria grows in them. It is important that the fasteners be easy to clean and easy to inspect. Thread with sharp corners are difficult to clean. Threads which make many turns are difficult to clean even if the corners are rounding. Where there is one turn of a large well-rounded thread a cloth can be passed around it with certain expectation that it will rub the entire surface. The herein disclosed sanitary fastener meets these requirements, as it is constructed so that its parts are exposed to fluid circulation, and visual inspection; and they are of such shape that the surfaces can be easily wiped clean and be washed clean.

The improved fastener, subject to certain differences hereinafter noted, may be regarded as a bolt with a single thread of not to exceed 360° extent and a nut with a complementary thread of not to exceed 360° extent. In the preferred embodiment shown, the "bolt" thread represents a rib raised above an otherwise generally smooth and cylindrical surface and extending helically about such surface less than 360°. In the "nut", the thread comprises a helical rib of less than 360° extent on the inside of an otherwise generally smooth and nearly cylindrical surface. Neither the interior surface of the nut or the exterior surface of the bolt is grooved. The entire interior and exterior surfaces of the fastening, including both ends of each thread, are fully exposed for cleaning, and not only fully accessible, but fully and completely visible, visibility being important in compliance with sanitary standards.

The two threads are designed with particular reference to the thickness of the intervening work member upon which the bearing surface of the nut seats, the objective being to assure contact between the two threads for substantially their entire length. This, of course, is of no consequence in a conventional nut and bolt, but it becomes important because of the very limited extent of the two threads here involved.

The cavity within the nut which might otherwise be closed by contact of the bearing surface of the nut with the engaged workpiece is desirably made accessible by porting the side wall of the nut to substantially the full height of the cavity, the various ports each extending substantially to the base of the thread at the point where the port is located.

For sanitary purposes, it is further desirable that the threads have a cross-sectional form deviating from conventional by the use of a large radius at the root of the thread and notably rounded edges at the apex.

It will be observed that neither the nut, nor the bolt element, of my improved sanitary fastener has anything resembling a groove.

In the accompanying drawing:

Fig. 1 is a view in cross-section through a sanitary fastener embodying my invention.

Fig. 2 is a view in cross-section through the nut portion of the sanitary fastener.

Fig. 3 is a view of the nut portion in side elevation.

Fig. 4 is an inverted plan view of the nut portion.

Fig. 5 is a greatly enlarged detail view in cross-section through the thread elements of the bolt and nut as they appear when engaged as in Fig. 1.

The nut, generically designated by reference character 7, is of annular form and may be manipulated in any desired way. However, it is desirably provided with integral wings 8 to be applicable and removable without a wrench.

From the crest 9 of the nut, its inner surface tapers conically at 10 toward the single thread 11 which, as above indicated, has less than 360° extent, its upper end being shown in dotted lines in Fig. 3 and in full lines in Fig. 4 at 12 and its lower end at 13. In practice, for reasons of strength and sanitation, I have found it desirable to base this thread on a four-pitch acme thread, but merging with a relatively large radius curve with the nut 7 at the root of the thread as indicated at 14 in Fig. 5.

Below the thread 11, the opening through the nut 7 expands slightly in a downward direction as is indicated by the outward inclination of the inner surfaces 15 (Figs. 1 and 2). The inner surface 15 is discontinuous, there being a plurality of ports 16, 17, 18 and 19 which provide circulation openings to and from the space that would otherwise constitute a closed cavity beneath the thread 11. The ports subdivide the lower end of the nut to provide a discontinuous bearing surface 20, the bosses 21, 22, 23 and 24 defined by the aforesaid ports all terminating in a common plane in which the bearing surface 20 is disposed.

While it is broadly immaterial where the two ends of the thread 11 are disposed, it will be observed that I have located both of these above the lateral port 16, as is best shown in Figs. 3 and 4, the extent of the thread being about 10° less than a full turn to allow free passage of fluid and expose both ends for inspection and cleaning.

The member 25 may, for convenience, be referred to as a bolt, although it does not conform with accepted practice in bolt manufacture. It can have, if required, an unthreaded shank portion at 26 and a flange 27, the upper surface 28 of which is opposed to the bearing surface 20 of the nut 7. The single thread 30 of bolt 25 is located at a point beyond surface 29 in a position on the upper end of the bolt which is desirably predetermined with accuracy, taking into account the thickness of the element 31 which is clamped between surfaces 28 and 20, it being desirable that the single turn of the thread 11 of the nut shall, when the nut is tightened on the workpiece 31, be in substantial registry with the single turn of thread 30 on bolt 25. As shown in Fig. 1, the upper end 32 of thread 30 desirably is in approximate registry with the upper end 12 of the nut thread 11, while the lower end 33 of bolt thread 30 is in substantial registry with the power end 13 of the nut thread 11.

Due to the fact that neither thread extends one full turn, each being desirably about 10° short of a full turn, it will be apparent that all surfaces are not only accessible, but visible, when the nut is unscrewed. There is nothing in the nature of a groove, wherein dirt would remain unseen in a conventional nut. Neither are there any sharp edges in which dirt may lodge. Neither is there any enclosed cavity between the nut and bolt beneath the threads in which liquid might be trapped in the assembled position of the parts, the ports through the side walls of the nut permitting fluid circulation about the bolt.

I claim:

1. In a sanitary fastener for exposure to contaminable fluids, a bolt element having a radial head with an axially exposed bearing surface, a neck portion adjacent said head, and a smooth-walled and generally cylindrical thread-bearing portion materially smaller in cross section than the neck portion and having a tapering shoulder connecting it with the neck portion, a single thread of approximately 360° helical extent projecting radially outwardly from the thread-bearing portion of the bolt and having its base concavely curvilinearly merging smoothly with the thread-bearing portion aforesaid, the ends of said thread being widely spaced to provide open clearance between said ends, and a nut having crest and bearing ends, and an intervening smooth-walled annular internal surface convexly curvilinearly tapering inwardly from the crest end of the nut, and a single thread of approximately 360° extent projecting radially inwardly from said annular surface and having its base concavely curvilinearly merging with said annular internal surface, the pitch of said thread being complementary to that of the bolt and the two threads being in bearing engagement substantially through their extent, the said internal smooth-walled surface of the nut being spaced from the thread-bearing portion of the bolt in excess of the radial depth of the respective threads and the said space opening between the ends of the respective threads through the crest end of the nut, the nut being further provided with passages opening through its bearing end communicating with such space.

2. In a sanitary fastener for exposure to contaminable fluids, a bolt element having a radial head with an axially exposed bearing surface, a neck portion adjacent said head, and a smooth-walled and generally cylindrical thread-bearing portion materially smaller in cross section than the neck portion and having a tapering shoulder connecting it with the neck portion, a single thread of approximately 360° helical extent projecting radially outwardly from the thread-bearing portion of the bolt and having its base concavely curvilinearly merging smoothly with the thread-bearing portion aforesaid, the ends of said thread being widely spaced to provide open clearance between said ends.

3. In a sanitary fastener for exposure to contaminable fluids, a nut comprising an annulus having crest and bearing ends and a thread not to exceed 360° in length and concavely merging at its base with the annulus, said nut having an interior wall surface curvilinearly tapering convexly inwardly axially from the crest end of the nut to said thread and also tapering axially inwardly from the bearing end of the nut to said thread, whereby said annulus has its maximum inward projection toward its axis at the base of said thread, the said thread having spaced free ends and having all of its surfaces completely visible through the respective ends of the annulus and freely accessible for cleaning.

4. The device of claim 3 in which said annulus has slots spaced peripherally and opening through the annulus and to its bearing end from the base of its thread and varying in depth according to the pitch of the thread.

ROY O. HENSZEY.

References Cited in the file of this patent

UNITED STATES PATENTS

| Number | Name | Date |
|---|---|---|
| 1,375,654 | Flood | Apr. 19, 1921 |
| 1,440,613 | Mathias | Jan. 2, 1923 |
| 2,044,444 | Pond | June 16, 1936 |
| 2,171,015 | Webb | Aug. 29, 1939 |
| 2,204,754 | Frame | June 18, 1940 |
| 2,380,690 | Graham | July 31, 1945 |
| 2,522,792 | Knockne | Sept. 19, 1950 |